Patented Dec. 1, 1942

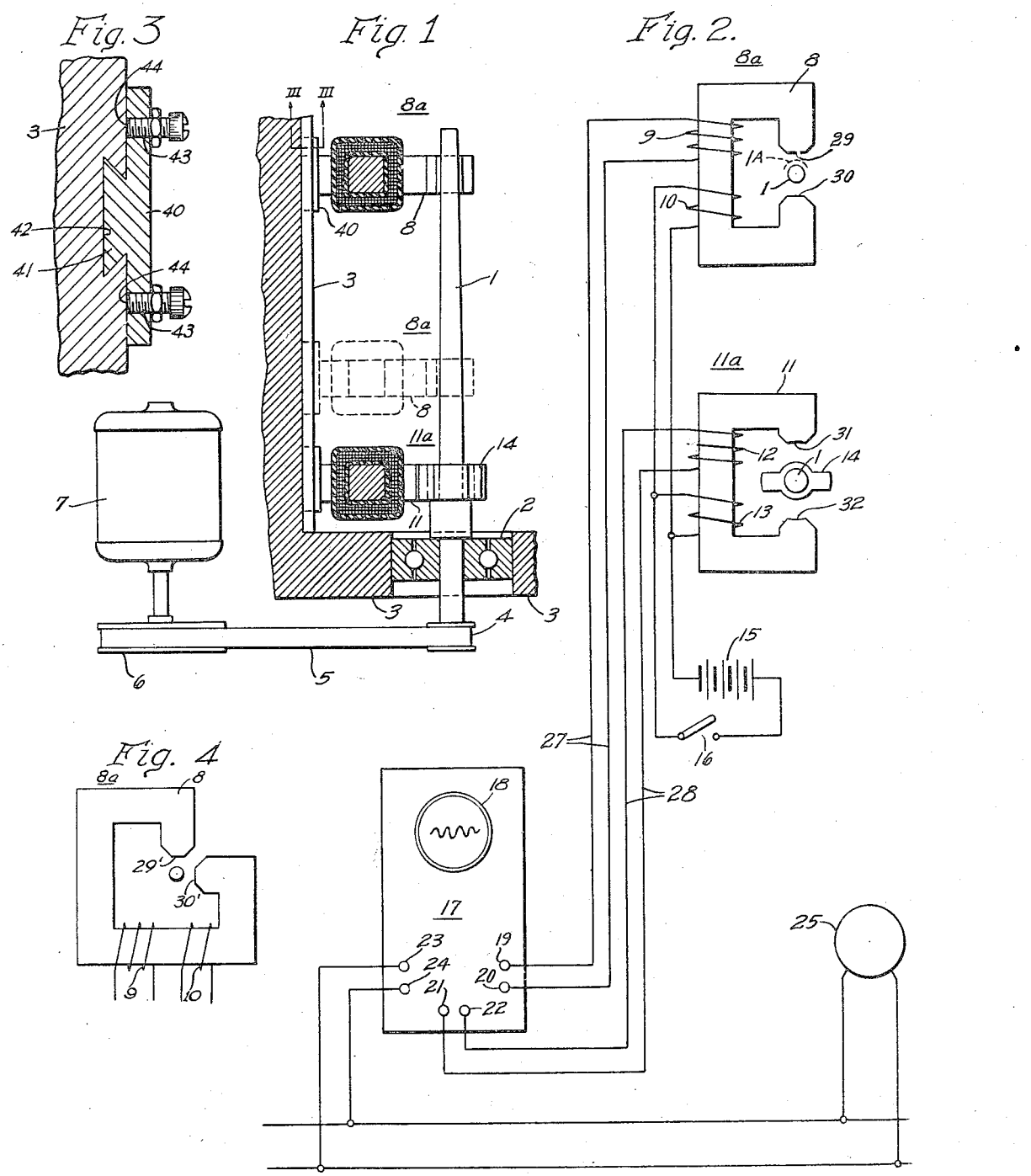

2,303,424

UNITED STATES PATENT OFFICE 2,303,424

SPINDLE UNBALANCE DETECTOR

Waldemar I. Bendz, Arlington, Mass., assignor to Westinghouse Electric & Manufacturing Company, East Pittsburgh, Pa., a corporation of Pennsylvania Application January 23, 1940, Serial No. 315,287

8 Claims. (Cl. 73—53)

My invention relates to apparatus for detecting the magnitude of dynamic unbalance of a rotatable body, for example, of a vertically mounted spindle.

An object of my invention is to provide a means by which the amount of whip of a vertically mounted spindle can be measured at various points along the spindle from the bearing end toward the unsupported end of the spindle, which measurement is intended to be a relative one and not necessarily an actual quantity.

Other objects and advantages will become more apparent from a study of the following specification when considered in conjunction with the accompanying drawing, in which:

Figure 1 is a side view, partly in cross section, of a vertically mounted spindle having magnetic pick-up devices for the purpose of measuring dynamic unbalance of the spindle;

Fig. 2 is a schematic showing of the control system used with the subject-matter shown in Fig. 1 for measuring dynamic unbalance of the spindle;

Fig. 3 is a detail sectional view, taken substantially in the line 3—3 of Fig. 1, showing the manner in which the movable pick-up unit is adjusted with respect to its support; and Fig. 4 is a showing of a modified form of pick-up coil for use in a system as shown in Fig. 2.

Briefly, the equipment, in accordance with my invention, consists of three essential parts. The first is a mechanical structure for supporting and rotating the spindle. The second is a pick-up coil which can be displaced along the spindle as desired. The third is a standard cathode ray oscilloscope and a second pick-up coil, the purpose of which is to synchronize the timing circuit of the oscilloscope with rotation of the spindle.

Referring more particularly to Figures 1 and 2, numeral 1 denotes a spindle which is held in a bearing 2 and supported in a framework 3. A pulley 4 is a part of the spindle and, therefore, rotates directly with it. A motor 7 drives a pulley 6 and by means of the belt 5 rotates the spindle pulley 4 at a high speed.

The magnetic pick-up unit 8a consists of an iron core magnetic circuit 8 with converging and confronting pole tips 29 and 30. A pick-up coil 9 and an exciting coil 10 are wound on the core of the magnet. The pole tips 29' and 30', if desired, may be disposed at right angles to each other as shown in the modification of Fig. 4, in order to spread the image in a horizontal direction on screen 18 of the oscilloscope.

As illustrated in Fig. 1, the pick-up unit can be displaced along the spindle 1 by means of a properly designed support 3 along which it may be slid and to which it may be clamped in any position. As best shown in Fig. 3, the plate 40 on which the pick-up unit is mounted is provided with a dove-tail tongue 41 slidably receivable in a slot 42 formed in the support 3. Set screws 43 are provided in the plate 40, the ends 44 of which are engageable with the support 3 for frictionally clamping the unit 8a in any desired vertical position.

A second magnetic pick-up unit 11a consisting of an iron core 11 and coils 12 and 13 is permanently located at the bottom end of the spindle close to the bearing. A small two pole rotor 14 slips over the end of the spindle and is closely fitted thereto so that the rotor 14 revolves with the spindle 1. A suitable source of constant potential direct current illustrated as a battery 15 is connected to the two exciting coils 10 and 13 of the two pick-up units. When the switch 16 is closed, these two exciting coils provide a constant magnetomotive force in the magnetic circuits 8 and 11 of the two pick-up units.

Referring to Fig. 2, it will be noted that the pick-up coil 9 is connected to "vertical-displacement" terminals 19 and 20 of the cathode ray oscilloscope by conductors 27. Terminals 19 and 20 of the oscilloscope 17 are the vertical displacement input terminals and a variation in voltage input to these terminals will result in vertical displacement of the wave appearing on the screen 18.

Referring again to Fig. 2, if the spindle 1 is either at rest or rotating truly between the pole tips 29 and 30 the flux passing through the air gap of the magnetic circuit will remain constant at a value determined by the strength of the exciting coil 10. Since the flux remains constant in the magnetic circuit no voltage is generated in the pick-up coil 9 and the wave appearing on the screen 18 of the oscilloscope will remain a straight line.

If the spindle does not rotate truly between the pole tips 29 and 30, the reluctance of the magnetic circuit across the pole tips changes the flux linking the pick-up coil 9. This is illustrated in Fig. 2, in which the dotted position 1A represents the instantaneous position of the spindle. It is intended that the pole tips 29 and 30 will be sufficiently narrow so that a rather small displacement of the spindle will result in a large change in flux crossing the air gap. As shown in the drawing, the pole tips 29 and 30, and likewise the pole tips 31 and 32, are tapered in order that the opposing faces will be narrow and the change in flux more responsive to small displacements. In addition, it will be noted that the facing surfaces of such pole tips are made slightly concave.

In the manner explained above, a variable voltage will be applied to the vertical displacement terminals 19 and 20 of the cathode ray oscilloscope if the spindle does not rotate truly between the pole tips of the pick-up unit 8.

The second pick-up unit 11a consisting of the core 11 and coil 12 is provided for the purpose of synchronizing the sweep oscillator circuit of the oscilloscope with respect to rotation of the spindle 1. The exciting coil 13 provides a constant magnetomotive force in the iron core 11. Since the iron rotor 14 rotates on the spindle and exactly with respect to its rotation the flux crossing the air gap between pole tips 31 and 32 will be altered twice for each complete revolution of the spindle. This change in flux linking the pick-up coil 12 results in two voltage pulses for each revolution of the spindle. These pulses are fed into the synchronizing circuit of the oscilloscope by means of conductors 28 connected to the horizontal displacment-timing terminals 21 and 22 of the oscilloscope 17. The operation of this synchronizing circuit is not described fully herewith because it is fully understood by anyone skilled in the art of oscilloscope application.

The power circuit input terminals 23 and 24 of the oscilloscope are connected to a suitable source of supply 25 which is generally a single phase alternating current source.

In the manner described above, the sweep frequency of the oscillator is adjusted to closely match the speed of rotation of the spindle and the pick-up unit 11a provides the synchronizing means by which the sweep circuit of the oscilloscope is caused to be synchronized with rotation of the spindle.

It is then apparent that the vertical displacement of the oscilloscope wave will be proportional to the degree of whip of the spindle as it is rotated between the pole tips of the pick-up unit 8a. The horizontal placement of any peaks that occur along the timing axis are kept in synchronism with respect to rotation of the spindle by means of pick-up unit 11a.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims.

I claim as my invention:

1. In combination with apparatus for supporting one end of a spindle to be tested and means for rotating the spindle, a device for measuring the amount of dynamic unbalance of said spindle including a magnetic pick-up device comprising a core having an open gap through which a relatively flexible portion of said spindle protrudes, a pick-up coil wound on said core, a second magnetic pick-up device comprising a core having an open gap adjacent the supported end of said spindle, a rotor mechanically coupled to said spindle and having salient poles mounted within said gap, a pick-up coil wound on said last-named core, said pick-up coils being connected to different pairs of terminals of a cathode ray oscilloscope, and energizing means for said cathode ray oscilloscope.

2. In combination with apparatus for supporting one end of a spindle to be tested and means for rotating the spindle, a device for measuring the amount of dynamic unbalance of said spindle including a magnetic pick-up device comprising a core having an open gap through which said spindle protrudes, a pick-up coil wound on said coil, a second magnetic pick-up device comprising a core having an open gap, a rotor mechanically coupled to said spindle and having salient poles mounted within said gap, a pick-up coil wound on said last-named core, said pick-up coils being connected to different pairs of terminals of a cathode ray oscilloscope, said first mentioned pick-up coil being connected to the "vertical displacement" terminals of said oscilloscope and said second pick-up coil being connected to "synchronizing terminals" to synchronize the timing circuit of the oscilloscope with rotation of the spindle.

3. In combination with apparatus for supporting one end of a spindle to be tested and means for rotating the spindle, a device for measuring the amount of dynamic unbalance of said spindle including a magnetic pick-up device comprising a core having an open gap through which said spindle protrudes, a pick-up coil wound on said core, a second magnetic pick-up device comprising a core having an open gap, a rotor mechanically coupled to said spindle and having salient poles mounted within said gap, a pick-up coil wound on said last-named core, each of said magnetic pick-up devices having a separate energizing coil, and a constant potential source connected to said energizing coils, said pick-up coils being connected to different pairs of terminals of a cathode ray oscilloscope, said first mentioned pick-up coil being connected to the "vertical displacement" terminals of said oscilloscope and said second pick-up coil being connected to "synchronizing terminals" to synchronize the timing circuit of the oscilloscope with rotation of the spindle.

4. In combination with apparatus for supporting one end of a spindle to be tested and means for rotating the spindle, a device for measuring the amount of dynamic unbalance of said spindle including a magnetic pick-up device comprising a core having an open gap formed by tapered poles through which a flexible portion of said spindle protrudes, a pick-up coil wound on said core, a second magnetic pick-up device comprising a core having an open gap adjacent the supported end of said spindle, a rotor mechanically coupled to said spindle and having salient poles mounted within said gap, a pick-up coil wound on said last-named core, said pick-up coils being connected to different pairs of terminals of a cathode ray oscilloscope, and energizing means for said cathode ray oscilloscope.

5. In combination with apparatus for supporting one end of a spindle to be tested and means for rotating the spindle, a device for measuring the amount of dynamic unbalance of said spindle including a magnetic pick-up device comprising a core having a pair of substantially concave, confronting pole faces forming an open gap of irregular width through which said spindle protrudes, a pick-up coil wound on said core, a second magnetic pick-up device comprising a core having an open gap, a rotor mechanically coupled to said spindle and having salient poles mounted within said gap, a pick-up coil wound on said last-named core, said pick-up coils being connected to different pairs of terminals of a cathode ray oscilloscope, and energizing means for said cathode ray oscilloscope.

6. In combination with apparatus for supporting one end of a spindle to be tested and means for rotating the spindle, a device for measuring the amount of dynamic unbalance of said spindle including a slidably mounted magnetic pick-up device comprising a core having an open gap through which said spindle protrudes, a pick-up coil wound on said core, a second magnetic pick-up device having a stationary mounting structure comprising a core having an open gap, a rotor mechanically coupled to said spindle and having salient poles mounted within said gap, a pick-up coil wound on said last-named core, said pick-up coils being connected to different pairs of terminals of a cathode ray oscilloscope, and energizing means for said cathode ray oscilloscope.

7. In combination with apparatus for supporting one end of a spindle to be tested and means for rotating the spindle, a device for measuring the amount of dynamic unbalance of said spindle including a magnetic pick-up device comprising a core having an open gap formed by poles disposed at right angles to each other through which the unsupported end of said spindle protrudes, a pick-up coil wound on said core, a second magnetic pick-up device comprising a core having an open gap, a rotor mechanically coupled to said spindle at the supported end thereof and having salient poles mounted within said gap, a pick-up coil wound on said last-named core, said pick-up coils being connected to different pairs of terminals of a cathode ray oscilloscope, and energizing means for said cathode ray oscilloscope.

8. In combination with apparatus for supporting one end of a spindle to be tested and means for rotating the spindle, a device for measuring the amount of dynamic unbalance of said spindle including a magnetic pick-up device comprising a core having an open gap through which said spindle protrudes, a pick-up coil wound on said core, a second magnetic pick-up device adjacent the supported end of the spindle comprising a core having an open gap, a rotor formed of a sleeve closely fit over said spindle and having a pair of poles projecting therefrom 180° apart mounted within said gap, a pick-up coil wound on said last-named core, said pick-up coils being connected to different pairs of terminals of a cathode ray oscilloscope, and energizing means for said cathode ray oscilloscope.

WALDEMAR I. BENDZ.